United States Patent Office 2,976,295
Patented Mar. 21, 1961

2,976,295 p-(3,5-DISUBSTITUTED AND 3,5,5-TRISUBSTITUTED - 2 - PYRAZOLIN - 1 - YL)BENZALDEHYDES

Arnold F. Plue, Albany, N.Y., assignor to General Aniline & Film Corporation, New York, N.Y., a corporation of Delaware No Drawing. Filed Dec. 17, 1958, Ser. No. 780,956

16 Claims. (Cl. 260—310)

This invention relates to the production of novel p-(3,5-disubstituted and 3,5,5-trisubstituted 2-pyrazolin-1-yl)benzaldehydes of the formula

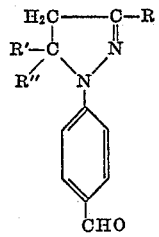

wherein R and R' are selected from the group consisting of lower alkyl, phenyl and naphthyl and their inert substituted derivatives, and R" is selected from the group consisting of H, R and R'. The lower alkyl radical, may contain about 1 to 4 carbon atoms. As substituents in the lower alkyl, phenyl or naphthyl radicals which are inert to the formylating reaction by which the above compounds are produced in accordance with this invention, there may be mentioned lower alkoxy, e.g., methoxy and ethoxy, halogen, e.g., chloro and bromo, nitro, lower dialkyl amino such as dimethyl- and diethyl-amino, cyano, sulfonamido, and mono- and di-substituted sulfonamido such as methyl-, ethyl-, morpholino-, and piperidino-, dimethyl- and diethyl-sulfonamido, and the like.

In general, these compounds are prepared by the formylation of the corresponding 3,5-disubstituted and 3,5,5-trisubstituted-phenyl-2-pyrazolines of the formula

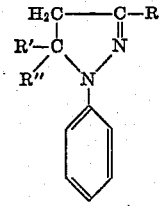

wherein R, R' and R" have the values given above. They are known compounds, different methods for preparation of which are described in the literature. For example, Beilstein 23, 245 shows the preparation of 1,3,5-triphenyl-2-pyrazoline by three different methods: by reaction of 2 - chloro - 2 - phenylpropiophenone with phenylhydrazine, by reaction of benzalacetophenone with phenylhydrazine and by reduction of 1,3,5 - triphenyl-pyrazole. Beilstein 23 [2], 273 shows the preparation of 1,3,5-tetraphenyl-2-pyrazoline by reacting β-phenyl chalkone or 2,2-diphenyl-2-hydroxypropiophenone with phenylhydrazines. Numerous other suitable starting 3,5-disubstituted and 3,5,5-trisubstituted-1-phenyl-2-pyrazolines, and methods for their preparation, are disclosed in the prior art. It is apparent that different 3,5-disubstituted and 3,5,5-trisubstituted-1-phenyl-2-pyrazolines may be readily produced by varying the reactants but still following these same general methods of preparation.

The following table exemplifies some of the pyrazoline compounds which may be used as starting materials in the preparation of the products of this invention. In this table the R, R' and R" columns signify the R, R' and R" substitutents in the above formula; $C_6H_5-$ and $C_6H_4-$ signify phenyl radicals, and $C_{10}H_7-$ signifies a naphthyl radical:

| Starting Compound | R | R' | R" |
|---|---|---|---|
| (1) | $CH_3-$ | $CH_3-$ | $CH_3-$ |
| (2) | $CH_3-$ | $C_6H_5-$ | H— |
| (3) | $C_2H_5-$ | $C_2H_5-$ | $C_2H_5-$ |
| (4) | $ClCH_2CH_2-$ | $CH_3-$ | $CH_3-$ |
| (5) | $NCCH_2CH_2-$ | $CH_3-$ | H— |
| (6) | $(CH_3)_2NCH_2CH_2-$ | $CH_3-$ | H— |
| (7) | $C_6H_5-$ | $CH_3-$ | $CH_3-$ |
| (8) | $C_6H_5-$ | $C_6H_5-$ | H— |
| (9) | $C_6H_5-$ | p-$(CH_3)_2NC_6H_4-$ | H— |
| (10) | $C_6H_5-$ | p-$CH_3OC_6H_4-$ | H— |
| (11) | $C_6H_5-$ | p-$(CH_3)_2NO_2SC_6H_4-$ | H— |
| (12) | $C_6H_5-$ | p-$H_2NO_2SC_6H_4-$ | H— |
| (13) | $C_6H_5-$ | p-$CH_3NHO_2SC_6H_4-$ | H— |
| (14) | $C_6H_5-$ | p—O$\diagup^{C_2H_4}_{C_2H_4}\diagdown$NO$_2$SC$_6$H$_4-$ | H— |
| (15) | $C_6H_5-$ | p—H$_2$C$\diagup^{CH_2-CH_2}_{CH_2-CH_2}\diagdown$NO$_2$SC$_6$H$_4-$ | H— |
| (16) | $C_6H_5-$ | $C_6H_5-$ | $C_6H_5-$ |
| (17) | p-$CH_3OC_6H_4-$ | p-$CH_3OC_6H_4-$ | H— |
| (18) | p-$CH_3OC_6H_4-$ | $C_6H_5-$ | H— |
| (19) | p-$(CH_3)_2NC_6H_4-$ | $C_6H_5-$ | H— |
| (20) | β-$C_{10}H_7-$ | $C_6H_5-$ | H— |
| (21) | β-$C_{10}H_7-$ | p-$CH_3OC_6H_4-$ | H— |
| (22) | p-$(CH_3)_2NO_2SC_6H_4-$ | $C_6H_5-$ | H— |
| (23) | $C_6H_5-$ | m-$ClC_6H_4-$ | H— |
| (24) | $C_6H_5-$ | m-$O_2NC_6H_4-$ | H— |
| (25) | α-$C_{10}H_7-$ | $C_6H_5-$ | H— |
| (26) | $CH_3-$ | α-(4—$CH_3OC_{10}H_7$)— | α-(4—$CH_3OC_{10}H_7$)— |

In order to formylate the above 3,5-disubstituted and 3,5,5 - trisubstituted 1 - phenyl - 2 - pyrazolines, they are treated with a formylating agent such as formamide, methyl-, ethyl-, dimethyl-, or diethyl-formamide, or formanilide, in the presence of an inorganic acyl halide, such as phosphorus oxychloride or thionyl chloride, which acts in a catalytic manner.

In general the proportions of reactants employed are in the ratio of a mole of the starting pyrazoline compound, a molecularly equivalent amount to a slight excess up to about 10% excess of acyl halide, and a minimum of 1 mole up to about 10 moles of formylating agent. Excess formylating agent acts as a solvent and the viscosity of the reaction mixture may be varied according to the amount of formylating agent which is present. It is also desirable sometimes to carry out the reaction in the presence of an added solvent which is inert under the conditions of the reaction, such as benzene, toluene, xylene, carbon tetrachloride and the like.

The reaction is exothermic, and may be carried out by simply mixing the reactants and catalyst and thereafter completing the reaction at elevated temperatures of about 90 to 125° C. However, I have found that the reaction runs more smoothly if the formylating agent and the acyl halide are combined at a temperature below 40° C., followed by slow addition with stirring of the pyrazoline compound at a temperature below 50° C., followed by heating at about 90 to 125° C., preferably 90 to 110° C., for from about ½ to 5 hours. The formylated product is then isolated, for example by drowning and crystallizing from water. In some cases when the product is drowned in water it precipitates as a gum which slowly changes to a crystalline material on stirring. Warming to 40 to 50° C. usually hastens the conversion. The cool crystalline product is filtered and washed with cold water. In order to further purify the product it may be recrystallized from suitable solvents, such as ethyl alcohol, isopropyl alcohol, benzene, benzene-ethyl alcohol mixtures and the like.

The p-(3,5-disubstituted and 3,5,5-trisubstituted 2-pyrazolin-1-yl)-benzaldehydes of this application are useful as intermediates, particularly in the production of dyes and photographic sensitizers by reaction with 2-methylene-1,3,3-trimethyl indoline in the presence of an acid condensing agent, as disclosed and claimed in my copending application Serial No. 780,916 filed on even date herewith.

The following examples, in which parts are by weight unless otherwise indicated, are only illustrative of this invention and are not to be regarded as limitative.

EXAMPLE 1

*Preparation of p-(3,5-diphenyl-2-pyrazolin-1-yl)-benzaldehyde*

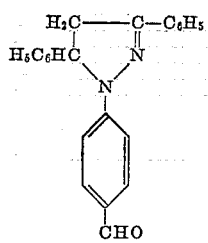

43.0 g. phosphorus oxychloride was added to 67.0 g. dimethylformamide at a temperature of about 25° C. To this was added 74.5 g. 1,3,5-triphenyl-2-pyrazoline. On standing for 15 minutes the temperature rose to about 30° C. It was heated to 95–100° C. and maintained at that temperature for 2 hours. It was poured into 1000 cc. water. An orange yellow oil was formed which set to a gum after a few minutes. After about 1 hour, it solidified. It was ground, leached with water and filtered. A recrystallization from ethanol resulted in the formation of pale yellow crystals having a M.P. 125–126° C. On analysis, the C, H, and N content was within the limits of experimental error of that calculated for a compound of the above formula.

EXAMPLE 2

*Proof of structure of the compound of Example 1*

The aldehyde group of the compound produced in Example 1 was reduced by a Wolff-Kishner reduction to the corresponding methyl substituted compound as follows:

To 15 cc. diethylene triamine was added 2.0 g. of the compound of Example 1, 3 cc. of 85% hydrazine hydrate and 1.0 g. potassium hydroxide powder. This mixture was heated 30 minutes at 80–90° C. During a period of 1½ hours the temperature was raised to 195° C., held at that temperature for 15 minutes, cooled, diluted with 5 parts by volume of cold water, filtered and washed with water. The product was recrystallized from an ethyl alcohol benzene mixture. It had a M.P. of 164–165° C.

Assuming the formula of Example 1 to be correct, the formula of this compound is:

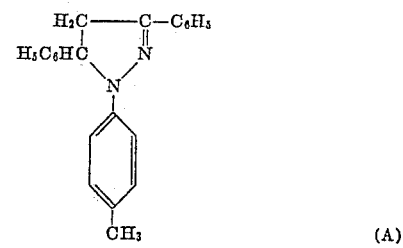

(A)

In order to definitely determine the constitution of this compound, the compound of this formula was synthesized in such a way that only a compound of that formula could be produced, as follows:

4.2 g. benzalacetophenone, 20 cc. acetic acid and 2.5 g. p-tolylhydrazine were heated together for 1 hour, cooled and filtered. On recrystallization from an ethyl alcohol-benzene mixture a product was obtained having a M.P. 163–165° C.

This is a known reaction. Its course may be depicted as follows:

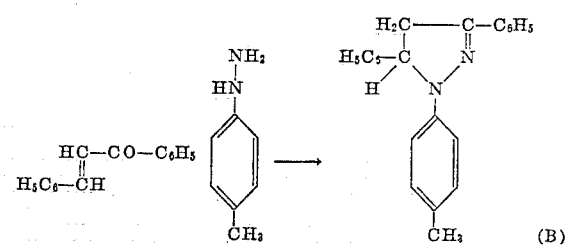

(B)

Mixed melting points made with a mixture of A and B resulted in no change in melting point, i.e., the mixture gave a melting point of 164–165° C., thus indicating A and B to be identical in structure. C, H and N analysis of A and B corresponded to that of the assigned formula.

EXAMPLE 3

*Preparation of p-(3,5-diphenyl-5-methyl-2-pyrazolin-1-yl)benzaldehyde*

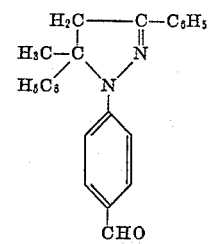

800 cc. acetic acid, 178.0 g. dypnone and 87.0 g. phenylhydrazine were combined at room temperature and then heated. At 90° C. crystallization began. It was refluxed for 20 hours, cooled to room temperature, filtered and washed with acetic acid and methyl alcohol. The product has the formula

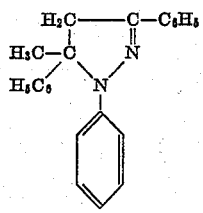

To 67.0 g. of dimethylformamide was added 43.0 g. phosphorus oxychloride and then 75.4 g. of this product. It was warmed to 95° C. and heated at about 95–100° C. for 2 hours, then drowned into 750 cc. cold water. The product separated as a yellow gum which solidified to a chunk. It was broken up, leached overnight, filtered and washed neutral to give a light yellow product. It was recrystallized from ethyl alcohol to give a product having a M.P. of 140–141° C. On analysis, the C, H and N content was within the limits of experimental error of that calculated for a compound of the above formula.

EXAMPLE 4

*Proof of structure of the compound of Example 3*

2.0 g. of the aldehyde of Example 3, 1.0 g. powdered KOH, 15 cc. diethylene triamine and 3 cc. 85% hydrazine hydrate were heated together at 95–100° C. for ½ hour. Over a 2 hour period the temperature was raised to 190° C. and maintained at 190–200° C. for ½ hour. It was cooled to about 100° C., diluted with 5–6 parts by volume of water and let stand over night. It was filtered, recrystallized from ethyl alcohol and filtered. The M.P. was 101–102° C. (4A).

2.4 g. p-tolylhydrazine, 4.4 g. dypnone and 20 cc. acetic acid were heated at the boil on a water bath for 7 hours, cooled, filtered and recrystallized from ethyl alcohol. The M.P. was 101–102° C. (4B).

4A and 4B crystals were mixed and a mixed M.P. taken and found to be still 101–102° C., thus, proving that the compound prepared by reducing the aldehyde of Example 3 and the compound prepared by a known method were the same, i.e.,

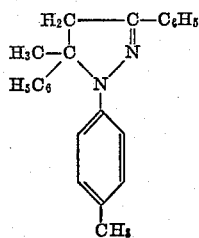

3,5-diphenyl-5-methyl-1-p-tolyl-2-pyrazoline thus proving that the formula as given in Example 2 for the adehyde is correct. C, H and N analysis of 4A and 4B corresponded to that of the assigned formula.

EXAMPLE 5

*Preparation of p-(3-methyl-5-phenyl-2-pyrazolin-1-yl) benzaldehyde*

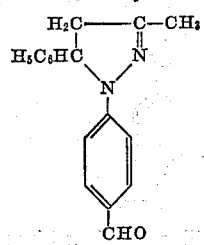

67.0 g. dimethylformamide and 43.0 g. phosphorus oxychloride were combined at about 25° C. To this was added 59.0 g. 1,5-diphenyl-3-methyl-2-pyrazoline (described in Ber. 42, 4419 (1909). The temperature rose somewhat, was heated to 95–100° C. and held there for 1½ hours. The charge was poured into ice and water, forming a gummy mass. On slowly warming to 50° C. with stirring the product gradually crystallized. It was stirred overnight, filtered, washed with water and recrystallized from 75% aqueous ethyl alcohol solution. The M.P. was 122–123° C. On analysis, the C, H and N content was within the limits of experimental error of that calculated for a compound of the above formula.

The aldehyde group was reduced in the manner of Example 2 to the corresponding methyl group. The M.P. of the product was 75–77° C.

2.4 g. p-tolylhydrazine, 4.0 g. benzalacetone and 15 cc. acetic acid were reacted in the manner of Example 2. The M.P. of the product was 76–77° C.

A mixed M.P. of these two compounds was 77–78° C., thus proving their identical structures and the fact that the formula as given above for the aldehyde is correct.

EXAMPLE 6

*Preparation of p-(3,5,5-trimethyl-2-pyrazolin-1-yl) benzaldehyde*

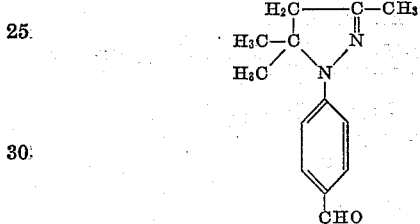

67.0 g. dimethylformamide and 43.0 g. phosphorus oxychloride were combined at a temperature below 30° C. To this was added 47.0 g. 3,5,5-trimethyl-1-phenyl-2-pyrazoline. The temperature was raised to and kept at 95–100° C. for 2 hours. It was poured into 1000 cc. cold water. After a few minutes an oil separated. It was stirred for 2 hours at about 10° C., and let stand over night. Tacky brown crystals formed which were recrystallized from 85% ethyl alcohol, yielding tan crystals, M.P. 63–65° C. On analysis, the C, H and N content was within the limits of experimental error of that calculated for a compound having the above formula.

EXAMPLE 7

*Preparation of p-(5-dimethylaminophenyl-3-phenyl-2-pyrazolin-1-yl)-benzaldehyde*

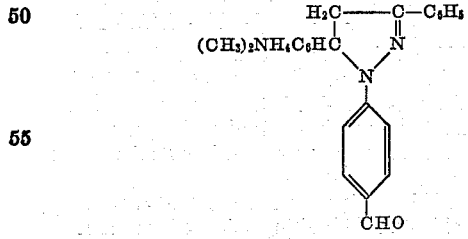

To 200 cc. ethyl alcohol were added 74.5 g. p-dimethylaminobenzaldehyde, 60.0 g. acetophenone and 1 cc. NaOH. It was warmed to solution (gentle simmer), cooled and let stand in the refrigerator, followed by filtering and recrystallizing from ethyl alcohol. This product is p-dimethylaminobenzalacetophenone.

25 g. of this compound and 150 cc. glacial acetic acid were combined. On addition of 13.0 g. phenylhydrazine the temperature rose from 25° C. to about 38° C. It was heated under reflux for about 1 hour, cooled and let stand over night followed by filtering and recrystallizing from ethyl alcohol. This product is 1,3-diphenyl-5-(p-dimethylaminophenyl)-2-pyrazoline.

To 11.0 g. dimethylformamide was added 8.0 g. phosphorus oxychloride (below 30° C.) followed by 17.0 g. of the above prepared pyrazoline. During addition the temperature was kept below 40° C. It was warmed on a water bath to 95–100° C. and held there for 2 hours, poured into 300 cc. water, warmed to 50° C. After cooling and standing overnight, it was filtered and recrystallized from ethyl alcohol. The M.P. was 167–168° C. On analysis, the C. H and N content was within the limits of experimental error of that calculated for a compound having the above formula.

In order to prove the structure, 2.0 g. of this aldehyde, 15 cc. diethylene triamine, 3 cc. hydrazine hydrate and 1.0 g. NaOH were reacted as in Example 2 in order to reduce the aldehyde group to a methyl group. The product had a M.P. of 131–132° (7A).

2.6 g. p-dimethylaminobenzalacetophenone, 1.3 g. p-tolylhydrazine and 10 cc. acetic acid were also reacted as in Example 2. The product had a M.P. of 132–133° C. (7B).

A mixed M.P. of these two products 7A and 7B was 131–132° C. thus proving that these two products were identical.

Since 7B was made by a known method, and is identical with 7A, it follows that the aldehyde of this example has the formula as shown.

EXAMPLE 8

*Preparation of p-(3-β-naphthyl-5-phenyl-2-pyrazolin-1-yl)benzaldehyde*

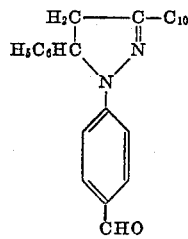

To 1000 cc. ethyl alcohol was added 170.2 g. β-acetonaphthone and 110.0 g. benzaldehyde. This was cooled to 15° C. 60.0 g. NaOH in 500 cc. water was added. The product formed an oil which crystallized as pale yellow ellets. It was filtered, washed with cold water and recrystallized from ethyl alcohol.

86.0 g. of this compound, 400 cc. glacial acetic acid and 40.0 g. phenyl hydrazine were heated to the boil. In about 3 minutes light yellow crystals appeared. It was cooled, filtered and washed with ethyl alcohol. This product is 3-β-naphthyl-1,5-diphenyl-2-pyrazoline.

74.0 g. dimethylformamide and 22.0 g. phosphorus oxychloride were combined at around 25° C. 43.5 g. of the above pyrazoline was added. It was heated to and maintained at 95–100° C. for 2½ hours, poured into 600 cc. cold water, stirred 3 hours, filtered and washed with water. The M.P. was 203–205° C. On analysis, the C, H and N content was within the limits of experimental error of that calculated for a compound having the above formula.

The accuracy of the assigned structure was proven by comparing and taking mixed melting points of the reduced aldehyde and a product of known structure produced by reacting benzal-β-acetonaphthone with p-tolylhydrazine according to the method described in Example 2.

EXAMPLE 9

*Preparation of p-(3-β-naphthyl-5-p-anisyl-2-pyrazolin-1-yl)-benzaldehyde*

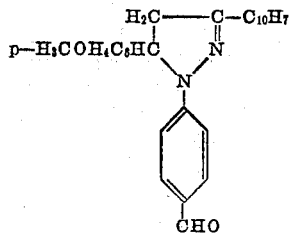

To 120 cc. ethyl alcohol was added 13.6 g. p-anisaldehyde, 16.8 g. β-acetonaphthone and 18.4 cc. 10% NaOH. It was allowed to stand for 1 hour, filtered, washed and recrystallized from ethyl alcohol.

58.0 g. of this product and 22.0 g. phenylhydrazine were added to 400 cc. glacial acetic acid and 100 cc. water. After heating to the boil for 15 minutes, it was cooled, allowed to stand overnight, filtered and recrystallized from benzene-methyl alcohol mixture. This product is 5-p-anisyl-3,β-naphthyl-1-phenyl-2-pyrazoline.

To 70.0 g. dimethylformamide was added 38.0 g. of this pyrazoline. At a temperature below 50° C. was added 18.0 g. phosphorus oxychloride. It was held at 50–60° C. for 15 minutes, warmed and held at 95–100° C. for 1½ hours. It was diluted slowly with 500 cc. water. The yellow granules were filtered and recrystallized from benzene-isopropyl alcohol solution. The M.P. was 160–161° C. On analysis, the C, H and N content was within the limits of experimental error of that calculated for a compound having the above formula.

The accuracy of the assigned structure was proven by comparing and taking mixed melting points of the reduced aldehyde and a product of known structure produced by reacting anisal-β-acetonaphthone with p-tolyhydrazine as described in Example 2.

EXAMPLE 10

*Preparation of p-[3,5-bis(p-anisyl)-2-pyrazoline-1-yl]benzaldehyde*

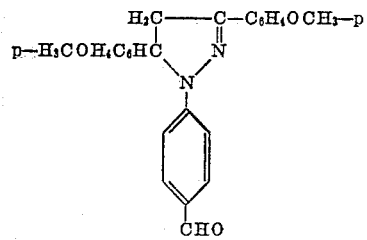

36.0 g. 3,5-bis(p-anisyl)-1-phenyl-2-pyrazoline (described in British Patent 669,591) was added to 70.0 g. dimethylformamide. At a temperature below 50° C., 18.0 g. phosphorus oxychloride was added. It was held at 50–60° C. for 15 minutes, heated to and held at 95–100° C. for 1½ hours. It was diluted slowly with 500 cc. water. It was gummy at first, but solidified after ½ hour. It was broken up, leached with cold water, filtered and recrystallized from benzene-isopropyl alcohol mixture. The pale yellow needles had a M.P. of 158–159° C. On analysis, the C, H and N content was within the limits of experimental error of that calculated for a compound having the above formula.

The accuracy of the assigned structure was proven by comparing and taking mixed melting points of the reduced aldehyde and a product of known structure produced by reacting 4,4'-dimethoxychalcone with p-tolylhydrazine as described in Example 2.

EXAMPLE 11

*Preparation of p-[3-(p-dimethylaminophenyl)-5-phenyl-2-pyrazolin-1-yl]-benzaldehyde*

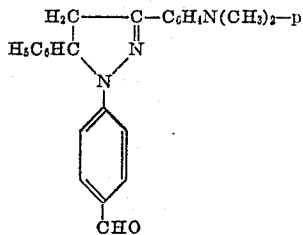

60.0 g. cinnamanilide (produced by reacting cinnamoyl chloride and aniline) was added to 120.0 g. dimethylaniline. At a temperature below 40° C. was added 60.0 g. phosphorus oxychloride. It was allowed to stand at 25-30° C. for 15 minutes, then warmed to and held at 95-100° C. for ½ hour. It was poured slowly into 500 cc. cold water. 120 cc. 40% by volume NaOH solution was added. The aniline and dimethylaniline were steam distilled, the water layer separated and the product washed with hot water. It was separated, heated at 90-100° C. with 500 cc. dilute HCl (1 part concd. HCl to 10 parts water), made alkaline, filtered and recrystallized from ethyl alcohol. This product is benzal-p-dimethylaminoacetophenone.

10.0 g. of this product, 4.5 g. phenylhydrazine and 50 cc. glacial acetic acid were heated 2 hours at 100° C., cooled to room temperature, filtered and recrystallized from benzene-ethyl alcohol mixture. This product is 3-(p-dimethylaminophenyl)-1,5-diphenyl-2-pyrazoline.

4.0 g. phosphorus oxychloride was added to 6.0 g. dimethylformamide at a temperature below 30° C. To this was added 8.0 g. of the above prepared pyrazoline. It was heated on a water bath for 1 hour, then slowly poured into 300 cc. cold water. A yellow precipitate formed, which was filtered after standing for an hour, washed and recrystallized from benzene-ethyl alcohol mixture. The M.P. of the desired product was 185-187° C.

The accuracy of the assigned structure was proven by comparing and taking mixed melting points of the reduced aldehyde and a product of known structure produced by reacting benzal-p-dimethylaminoacetophenone with p-tolylhydrazine according to the method described in Example 2.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:
1. A compound of the formula

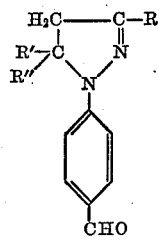

wherein R and R' are selected from the group consisting of lower alkyl, phenyl and naphthyl and these monosubstituted by a member selected from the group consisting of lower alkoxy, halogen, nitro, lower dialkylamino, cyano, sulfonamido, N-lower alkyl sulfonamido, N,N-bis(lower alkyl)sulfonamido, N,N-morpholinyl sulfonamido, and N,N-piperidinyl sulfonamido, and R" is selected from the group consisting of H, R and R'.

2. p-(3,5-diphenyl-2-pyrazolin-1-yl)benzaldehyde.
3. p-(3,5-diphenyl-5-methyl-2-pyrazolin-1-yl)benzaldehyde.
4. p-(3-methyl-5-phenyl-2-pyrazolin-1-yl)benzaldehyde.
5. p-(3,5,5-trimethyl-2-pyrazolin-1-yl)benzaldehyde.
6. p-(5-dimethylaminophenyl-3-phenyl-2 - pyrazolin-1-yl) benzaldehyde.
7. p-(3-β-naphthyl-5-phenyl-2-pyrazolin-1-yl)benzaldehyde.
8. p-(3-β-naphthyl-5-p-anisyl-2-pyrazolin-1-yl)benzaldehyde.
9. p-[3,5-bis(p-anisyl)-2-pyrazolin-1-yl]benzaldehyde.

10. p-[3-(p-dimethylaminophenyl)-5-phenyl-2-pyrazolin-1-yl]-benzaldehyde.

11. A process comprising heating one mole of a compound of the formula

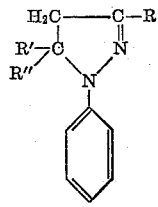

wherein R and R' are selected from the group consisting of lower alkyl, phenyl and naphthyl and these monosubstituted by a member selected from the group consisting of lower alkoxy, halogen, nitro, lower dialkylamino, cyano, sulfonamido, N-lower alkyl sulfonamido, N,N-bis-(lower alkyl)sulfonamido, N,N-morpholinyl sulfonamido, and N,N-piperidinyl sulfonamido, and R" is selected from the group consisting of H, R and R', with at least one mole of a formamide formylating agent selected from the group consisting of formamide, methylformamide, ethylformamide, dimethylformamide, diethylformamide, and formanilide at a temperature of about 90 to 125° C. in the presence of an amount of an inorganic acyl halide about molecularly equivalent to the said compound.

12. A process as defined in claim 11 wherein the inorganic acyl halide is selected from the group consisting of phosphorus oxychloride and thionyl chloride.

13. A process as defined in claim 11, wherein the inorganic acyl halide is phosphorus oxychloride.

14. A process comprising mixing an inorganic acyl halide with at least one mole of a formamide formylating agent selected from the group consisting of formamide, methylformamide, ethylformamide, dimethylformamide, diethylformamide, and formanilide at less than 40° C., adding to this mixture at less than 50° C. about one mole of a compound of the formula

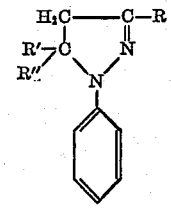

wherein R and R' are selected from the group consisting of lower alkyl, phenyl and naphthyl and these monosubstituted by a member selected from the group consisting of lower alkoxy, halogen, nitro, lower dialkylamino, cyano, sulfonamido, N-lower alkyl sulfonamido, N,N-bis(lower alkyl) sulfonamido, N,N-morpholinyl sulfonamido, and N,N-piperidinyl sulfonamido, and R" is selected from the group consisting of H, R and R', and then heating the resulting mixture at about 90 to 125° C., said acyl halide being employed in an amount about molecularly equivalent to said compound.

15. A process as defined in claim 14 wherein the inorganic acyl halide is phosphorus oxychloride.

16. A process as defined in claim 14 wherein said resulting mixture is heated at about 90-110° C.

References Cited in the file of this patent
UNITED STATES PATENTS
2,891,070    Ledrut _____ June 16, 1959